Figure 1:
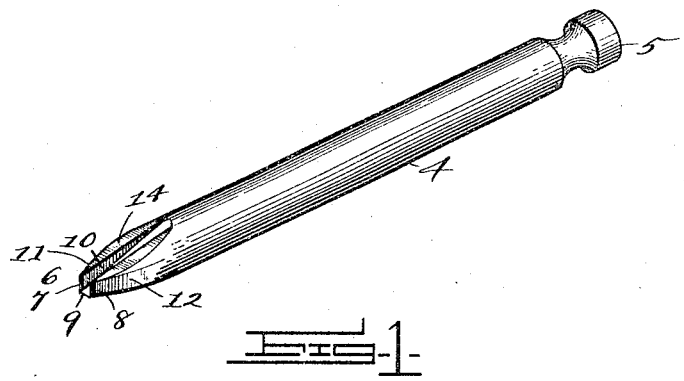

E. HANSCHEN.
HOOF GOUGE.
APPLICATION FILED AUG. 15, 1914.

1,122,916.

Patented Dec. 29, 1914.

WITNESSES

INVENTOR
Ernst Hanschen
BY
ATTORNEYS

UNITED STATES PATENT OFFICE.

ERNST HANSCHEN, OF VALENTINE, TEXAS.

HOOF-GOUGE.

1,122,916.  Specification of Letters Patent.  Patented Dec. 29, 1914.

Application filed August 15, 1914. Serial No. 856,949.

*To all whom it may concern:*

Be it known that I, ERNST HANSCHEN, a citizen of the United States, and a resident of Valentine, in the county of Jeff Davis and State of Texas, have invented certain new and useful Improvements in Hoof-Gouges, of which the following is a specification.

My invention relates to the shoeing of horses, particularly to the clenching of the nails after they have been driven upwardly through the side of the hoof, and the main object of the invention is to provide a device for forming a recess wherein such clenched nail may be completely embedded against any possibility of accidental straightening or loosening, as by one hoof striking the other, or striking a stone or other object, and against possible injury to the horse because of the present frequent failure to completely embed the nails in the hoof.

The present method is to employ a rasp to form a groove adjacent the nail, but such grooves are seldom of sufficient depth to completely embed the nail, and the rasping of the surface of the hoof frequently causes cracks in the hoof to appear, and which require treatment to prevent the spread thereof, but my device dispenses with the use of the rasp and forms a recess of just the proper length and depth, and does not even touch the surface of the hoof except in the exact position of such recesses, thereby avoiding any possibility of such cracks.

My invention is fully described in the following specification, of which the accompanying drawings form a part, in which the separate parts are designated by the same reference characters in each of the views, and in which:—

Figure 2:
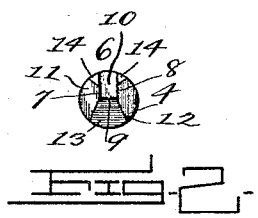
Figure 3:
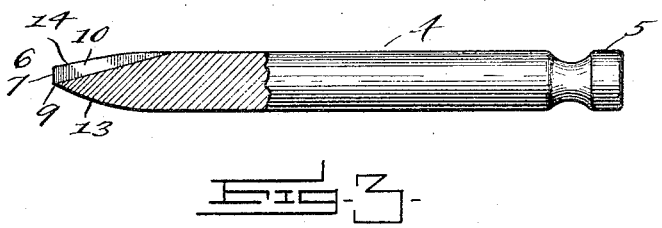

Figure 1 is a perspective view of the device; Fig. 2 is a view of the cutting end thereof; and Fig. 3 is a side view, partly in section to show the construction.

In the drawings forming a part of this application I have shown a present preferred form of embodiment of my invention, comprising a body member 4, preferably of round bar iron or steel, although not necessarily, a head 5, and a cutting end 6. The end 6 consists of three cutting edges, 7, 8, and 9, formed by a channel 10, cut longitudinally into but not through the end 6, and the inclined sides 11 and 12, and inclined lower surface 13, and I may also, as shown, cut the top surface away at 14 to reduce the height of the cutting edges 7 and 8. It will thus be seen that I provide an angular gouge, the floor of which is upwardly inclined, and the cutting edges of which, side and bottom, are adapted to be sharpened by grinding the sides 11 and 12, and the bottom 13, and the height of the side cutters of which is determined by grinding the upper side of the body member 4.

In practice, after a nail has been driven through a hoof in such manner as to project through the side thereof for clenching, I place the device against the hoof at a proper cutting angle and tap the same with a hammer to cut a channel in the hoof, beginning at a distance from the nail about equal to the height of the projecting portion thereof, and cutting toward the base of such projecting portion of the nail and, when the channel is cut, the nail may be clenched and completely buried in said channel, against any possibility of its accidental movement thereout of, or of any portion thereof projecting above the surface of the hoof. The channel so formed is of just the right width and depth, and no filing of the nail is necessary because of its projection above the hoof's surface, as is now frequently necessary by the rasp method, with the consequent weakening of the nail, as the nails with my device are entirely below the surface of the hoof when clenched.

My device is very simple, though efficient, very small and compact, very inexpensive, and may be easily sharpened on a grindstone, and, while I have shown my present preferred form, I may make changes thereover, within the scope of the following claims, without departing from the spirit of my invention, or sacrificing its advantages.

Having fully described my invention, what I claim as new, and desire to secure by Letters Patent, is:—

1. A hoof gouge, comprising a bar section having a longitudinal groove formed at its forward end, said bar section having its sides forwardly and inwardly inclined to form cutting edges at the sides of said groove, and the bottom thereof having an arcuate inclination, forwardly and upwardly, to form a cutting edge at the bottom of said groove, whereby said gouge will be forced out of the body of a hoof when driven forwardly.

2. A hoof gouge, comprising a bar section having a longitudinal groove formed at its forward end, said bar section having its sides forwardly and inwardly inclined to form cutting edges at the sides of said groove, and the bottom thereof having an arcuate inclination, forwardly and upwardly, to form a cutting edge at the bottom of said groove, whereby said gouge will be forced out of the body of a hoof when driven forwardly, and having the top thereof forwardly and inwardly inclined to limit the height of the side cutting edges.

In testimony that I claim the foregoing as my invention, I have signed my name to this specification in the presence of the subscribing witnesses.

ERNST HANSCHEN.

Witnesses:
LESTER S. SMITH,
L. D. LOUTHIAN.